Figure 1:
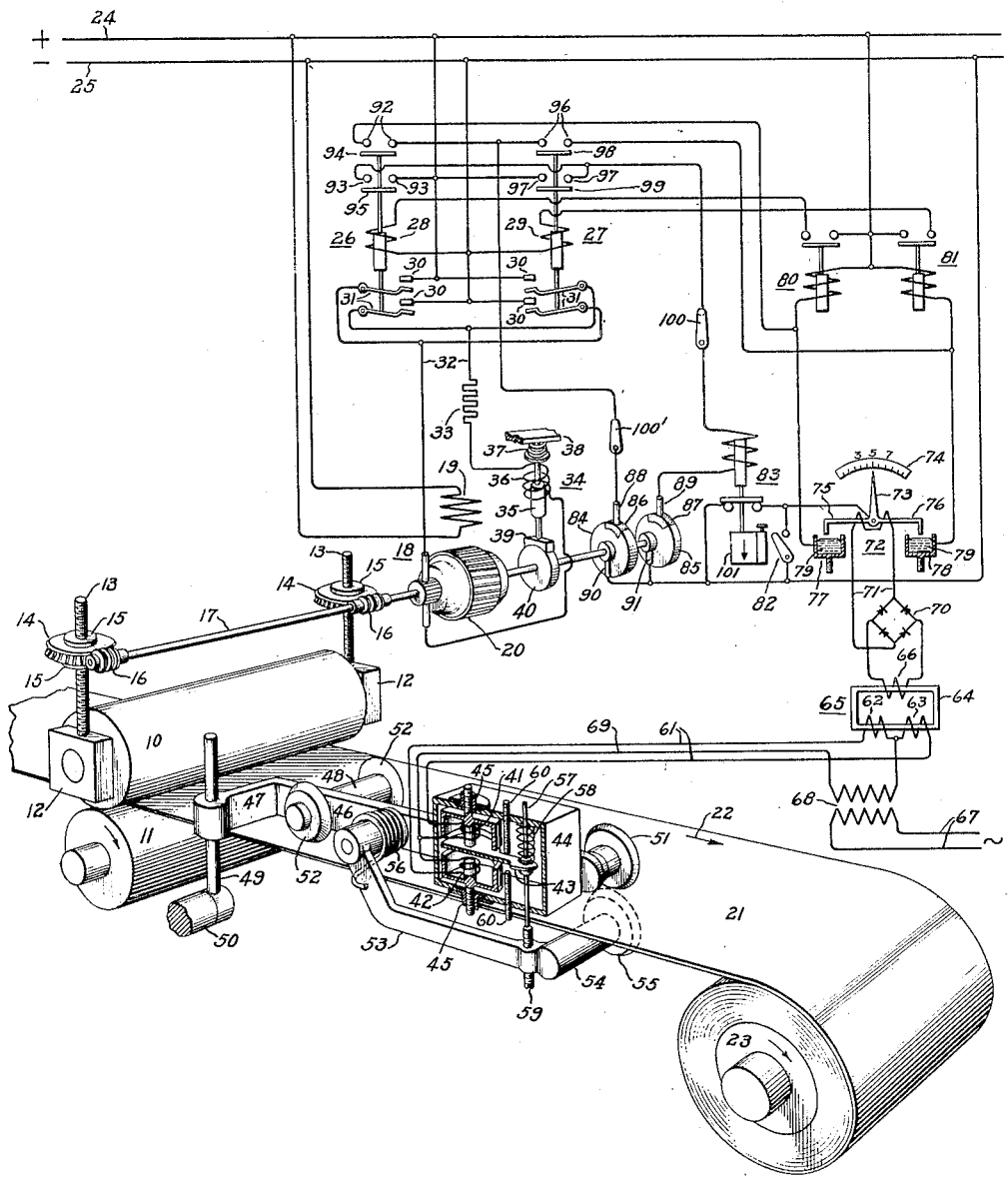

Aug. 7, 1934.    H. A. WINNE    1,969,536
APPARATUS FOR CONTROLLING THE THICKNESS OF STRIP MATERIAL
Filed Feb. 18, 1932    2 Sheets-Sheet 2
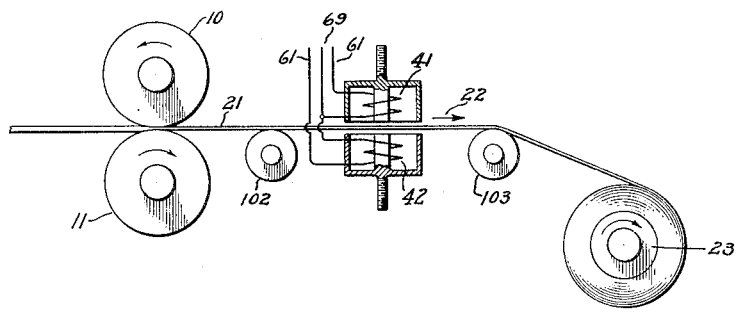
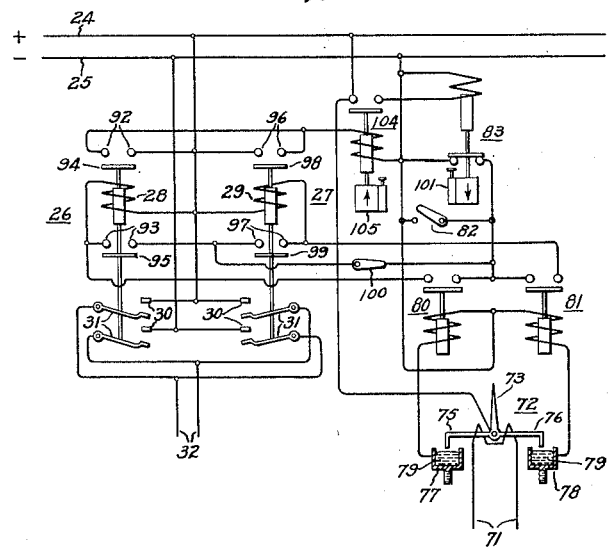
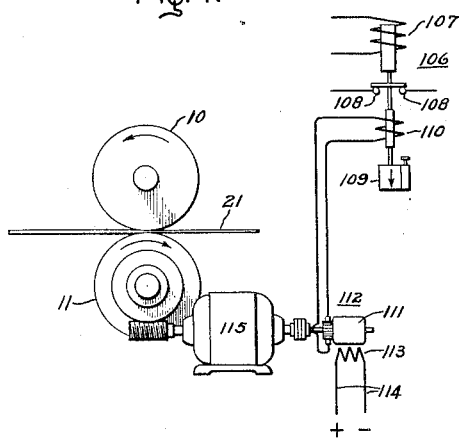
Inventor:
Harry A. Winne,
by Charles E. Tullar
His Attorney.

Patented Aug. 7, 1934

1,969,536

UNITED STATES PATENT OFFICE 1,969,536

APPARATUS FOR CONTROLLING THE THICKNESS OF STRIP MATERIAL

Harry A. Winne, Schenectady, N. Y., assignor to General Electric Company, a corporation of New York Application February 18, 1932, Serial No. 593,834

21 Claims. (Cl. 80—56)

My invention relates to apparatus for automatically controlling the thickness of strip material produced by various types of machines, as, for example, metal strips produced by rolling mills, paper strips produced by paper-making machines, strips of rubber or rubberized material produced by calender machines, etc. These machines have mechanism operatively associated therewith for effecting a change in the thickness of the strip being produced, and the principal object of my invention is to provide apparatus for automatically controlling this mechanism, whatever its nature or form, so that the machine will produce, when desired, strips whose thickness at any part thereof is within a fractional thousandth part of an inch of a predetermined value.

Other objects and aims of my invention, together with the inherent advantages thereof, will be in part obvious and in part specifically referred to during the course of this specification.

As previously stated, my invention may be employed for controlling the thickness of strip material produced by machines in widely differing industrial fields, but at present I regard the control of the thickness of metal strips produced by a rolling mill as the most important practical application of my invention. Accordingly, my invention will be described in connection with a rolling mill for producing sheet metal, but I wish it clearly understood that my invention is in no respect limited to this industrial field.

Prior to my invention, apparatus was proposed for automatically controlling the thickness of rolled metal. The following brief description of the prior art apparatus will help to understand the necessity for and the advantages of my invention. So far as I know, the prior art apparatus employ an electric motor for adjusting the position of the upper roll of the mill, stationary and movable contacts for controlling the starting, stopping, and direction of rotation of this motor, and a gauging roller on the rolled strip at some distance from the mill, this roller operating directly through one or more levers to move the movable contact. The accuracy range of the apparatus, i. e., the limits within which the apparatus confines the variations in the thickness of the rolled strip, is determined by two factors. One factor depends on the distance which the movable contact must be moved from the position where it effects operation of the roll adjusting motor in one direction of rotation to the position where it effects operation of the roll adjusting motor in the opposite direction of rotation, and the second factor depends on the change in the thickness of the metal being rolled due to operation of the roll adjusting motor during the time it takes for metal leaving the mill rolls to reach the gauging rollers. The accuracy range is determined by the sum of these factors and cannot be less than that due to the first mentioned factor. The first mentioned factor cannot be made sufficiently small to result in a narrow accuracy range, because mechanical considerations dictate the use of reasonably short levers between the gauging roller and the movable contact, and because the distance traveled by the movable contact must be sufficiently great so that the vibration which is always present to some extent near rolling mills does not cause the premature closing of the contacts. The second mentioned factor varies with changes in the ratio between the speed of the roll adjusting motor and the rolling speed of the mill. The rolling speed of the mill is frequently changed for rolling the same or different kinds of metals. It will be obvious that under certain conditions the second mentioned factor may cause a hunting action of the roll adjusting motor, thus resulting in rolled metal whose thickness varies periodically up and down along its length. The net result is that under the most favorable operating conditions of the mill the accuracy range is practically determined by the first mentioned factor, and as pointed out this cannot result in a narrow accuracy range, whereas under less favorable operating conditions the accuracy range is broadened, because it is determined by the sum of both factors. In addition, a spark occurs every time the contacts are opened, and due to the frequent opening and closing of the contacts the sparking may soon corrode them and thus further broaden the accuracy range. It therefore became desirable to provide apparatus for controlling a rolling mill that is simple and rugged in construction, reliable in use, and that will control the mill so that the latter will roll strips of metal having a very narrow accuracy range irrespective of the rolling speed of the mill.

My invention provides this desired type of apparatus. Briefly described, my invention consists of a Wheatstone bridge energized by alternating current and having at least one coil connected in one of its arms, this coil being so associated with the moving strip of rolled metal that variations in the thickness thereof changes the impedance of the coil, thus varying the difference of potential across the bridge, caused by an unbalance thereof, in accordance with variations in the thickness of the rolled metal. I then impress on electroresponsive means a voltage whose magnitude is responsive to this difference of potential across the Wheatstone bridge. The electroresponsive means effect the operation of the roll adjusting motor to raise or lower the upper roll of the mill whenever the thickness of the metal varies appreciably from a predetermined value. The use of the Wheatstone bridge makes it possible to reduce the first mentioned factor to a negligible value, and to eliminate almost completely the danger of a broadening of the accuracy range due to vibration or sparking of contacts, if the electroresponsive means employ a movable contact. I also provide additional means for practically eliminating the effect of the second mentioned factor on the accuracy range. These additional means need not be used when the thickness gauging means employed can be placed very close to the rolling mill, or when the rolling speed of the mill is such that the second mentioned factor is negligible, but may be placed into operation when it is desired to eliminate the effect of the second mentioned factor on the accuracy range. These additional means consist of time delay means, or of mechanism operated by the roll adjusting motor and time delay means, either of these arrangements being so associated with the previously mentioned electroresponsive means that an appreciable variation in the thickness of the rolled metal from the predetermined value effects the operation of the roll adjusting motor for a predetermined period, which is followed by a further predetermined period during which the above apparatus prevents operation of the motor. These additional means are preferably adjusted so that at the normal rolling speed of the mill the magnitude of this further period is sufficient to permit that part of the metal which left the mill at the instant the upper roll of the mill was brought to its new position to reach the Wheatstone bridge coil associated with the moving strip of rolled metal. I also provide means for obtaining the last described result at all rolling speeds of the mill.

My apparatus and the manner of its operation to produce the above described results will be best understood from the following description when considered in connection with the accompanying drawings, while those features of my apparatus which are believed to be novel and patentable are pointed out in the appended claims.

Fig. 1 of the drawings represents a view, partly in perspective and partly in front elevation, of a preferred embodiment of my invention as applied to a rolling mill. This preferred embodiment employs gauging means in contact with opposite sides of the rolled metal for changing the relative impedances of two Wheatstone bridge coils in accordance with variations in the thickness of the rolled metal, and electroresponsive means energized by the bridge for controlling the roll adjusting motor. Fig. 1 also shows mechanism operated by the roll adjusting motor and time delay means, which may be placed in operative relationship with the electroresponsive means for jointly controlling the roll adjusting motor. Fig. 2 represents an embodiment where the rolled metal, if it is of magnetic material, varies the relative impedances of the Wheatstone bridge coils without employing gauging means in contact with the rolled metal. Fig. 3 represents time delay means which may be substituted for the combined time delay means and the mechanism driven by the roll adjusting motor in Fig. 1. Fig. 4 represents a preferred embodiment of means for maintaining an inverse ratio between the magnitude of the period during which operation of the roll adjusting motor is prevented and the rolling speed of the mill. Similar parts in the various figures are represented by the same reference characters.

In Fig. 1, I represent only the portion of a rolling mill that is necessary for the description of my invention. The upper and lower rolls of the mill are represented by 10 and 11, respectively. I will assume that rolls 10 and 11 are driven by any suitable means, as, for example, through gears by an electric motor (see Fig. 4). Roll 10 is supported on bearings 12, which are secured to threaded studs 13. Worm wheels 14 have internal threads similar to those of studs 13 and are screwed thereon. Thrust blocks 15 are secured to the top and bottom faces of worm wheels 14. Suitable means (not shown) are associated with thrust blocks 15 for preventing movement of worm wheels 14 in a vertical plane, while at the same time permitting their rotation. In mesh with the external threads of worm wheels 14 are worms 16 secured to a shaft 17. A direct current motor 18 has a stationary shunt exciting winding 19 and a rotatable armature 20 directly coupled to shaft 17. Any suitable speed changing means may be interposed between armature 20 and shaft 17, but for the sake of simplicity I have shown them directly coupled to each other. It is clear that rotation of armature 20 in one direction raises roll 10 and rotation of armature 20 in the opposite direction lowers roll 10. I have also represented a strip of metal 21 in the process of being rolled with rotation of roll 11, as shown by the arrow thereon, thereby causing movement of the strip in the direction shown by arrow 22. Strip 21, if sufficiently thin, may be wound on a winding reel 23, which is rotated in the direction shown by the arrow thereon by any suitable means (not shown), so as to keep the strip between the rolls and the reel in taut condition.

I prefer to reverse the rotation of armature 20 by reversing the direction of current flow therethrough. Accordingly, I have shown exciting winding 19 directly connected to a direct current source represented by lines 24 and 25, and electroresponsive switches 26 and 27 for connecting armature 20 to lines 24 and 25. Switches 26 and 27 have closing coils 28 and 29, respectively, stationary contacts 30, and movable contacts 31. Contacts 30 are connected to lines 24 and 25, and contacts 31 are connected to armature 20 through leads 32. The connections are such that if switch 26 is closed the current from lines 24 and 25 will flow through armature 20 to make it rotate in the direction for raising roll 10, and if switch 27 is closed the current flow through the armature will be reversed so that it will rotate in the direction for lowering roll 10. A resistance 33 is connected in series with armature 20 to reduce the current rush therethrough at the instant it is connected to lines 24 and 25. An electromagnetically operated brake represented by 34 comprises a magnetic core 35 surrounded by a coil 36 which is connected in series with armature 20, a compression spring 37 between core 35 and a stationary plate 38, and a shoe 39 attached to core 35 and adapted to engage the periphery of a braking drum 40 which is attached to armature 20. Coil 36 is so positioned relatively to core 35 that at the instant armature 20 is connected to lines 24 and 25 the current flow through the coil causes it to lift shoe 39 off drum 40, thus permitting rotation of the armature. It follows that at the instant armature 20 is disconnected from lines 24 and 25, the compression spring 37 will force shoe 39 against drum 40, thus quickly bringing armature 20 to rest. Any other type of braking means may be employed for quickly bringing armature 20 to rest when it is deenergized and for permitting it to rotate when it is energized.

For effecting the operation of switch 26 or 27 in response to variations in the thickness of the rolled material, I provide electromagnetic means associated with the rolled material for delivering a voltage whose magnitude changes with variations in the thickness, and electroresponsive means on which this voltage, or a voltage responsive thereto, is impressed. For the electromagnetic means, I prefer to employ two oppositely disposed coils 41 and 42, preferably provided with magnetic cores, and a magnetic armature 43 between the adjacent ends of the coils to function as a part of their magnetic circuits. Coils 41 and 42 and their magnetic cores are mounted in a casing 44, the positions of the coils being adjusted by turning nuts 45. Casing 44 is secured to a lever 46, which is located above strip 21. Lever 46 has an offset arm 47 extending away from strip 21, and an offset arm 48 extending partly across the strip. Arm 47 is slidably mounted on a rod 49, which is pivotally mounted in a stationary bracket 50. A circular hardened roller 51 is rotatably mounted on the front end of lever 46, and circular hardened rollers 52 are rotatably mounted on the lever near its back end and on arm 48, respectively. Pivotally mounted in lever 46 is a lever 53 having an arm 54 extending partially across strip 21, underneath thereof. A circular hardened roller 55 is rotatably mounted on the end of arm 54, the length of this arm being such that rollers 51 and 55 are substantially opposite each other. A tension spring 56 is so placed between levers 46 and 53 as to continually urge rollers 51 and 55 towards each other. The peripheries of all the rollers are suitably shaped so as not to cut or mar the strip, and yet present narrow rounded contact surfaces thereto so as to prevent any oil which may be on the strip from forming a film between the rollers and the strip. The magnetic armature 43 is secured to a rod 57, which is slidably mounted in casing 44. A helical compression spring 58 is positioned between the end of armature 43 secured to rod 57 and the top inner wall of casing 44. The lower end of rod 57 abuts the end of a screw 59 which is adjustably threaded in lever 53. Although not essential, adjustable screws 60 are threaded into casing 44 to be in the path of movement of magnetic armature 43 so as to limit the upper and lower positions thereof, if this is desired.

As strip 21 is rolled and wound on reel 23, the diameter of the latter with the strip increases, thus changing the angle which the plane of the strip between the reel and the rolling mill makes with the horizontal. However, arm 47 is free to slide on rod 49 and the latter is free to rotate on bracket 50, and, therefore, during the entire building up of the reel all the rollers are in contact with the strip and there is no change in the angle which a plane through the axes of rollers 51 and 55 makes with the plane of the strip between the reel and the rolling mill. It should now be evident that rollers 51 and 55 will accurately gauge the thickness of the rolled strip at all times and thus change the relative positions of the magnetic armature 43 and the coils 41 and 42 in response to variations in the thickness. Furthermore, my structure permits the operator quickly to swing the above described gauging device away from its operating position with a strip and quickly to return the same to its operating position, this feature being useful when finishing the rolling of one strip and starting the rolling of the next strip. If strip 21 is too thick to be wound on reel 23, the latter will not be driven but will merely act as a roller with the strip passing over it as a continuous sheet to be cut into suitable lengths in accordance with well known mill practice. It is clear that under these conditions the rolls 51 and 55 also will accurately gauge the thickness of the rolled strip.

Coils 41 and 42 are preferably connected in two arms of a Wheatstone bridge by leads 61, the other two arms of the bridge consisting of two primary windings 62 and 63 which are oppositely wound on a magnetic core 64 of a transformer 65 having a secondary winding 66. An alternating current source 67 energizes the bridge circuit through a transformer 68. One terminal of the secondary winding of transformer 68 is connected to a common connection of primary windings 62 and 63, and the other terminal of the secondary winding is connected through lead 69 to a common connection of coils 41 and 42. The coils 41 and 42 are practically duplicates of each other with respect to number of turns, size of wire, etc., and the same is true of primary windings 62 and 63. It is clear that when magnetic armature 43 is substantially central between the adjacent ends of coils 41 and 42, the bridge will be balanced and the currents in primary windings 62 and 63 will be substantially equal, and no voltage will be induced in secondary winding 66. If armature 43 is moved from the above described position, the bridge will become unbalanced and the voltage induced in secondary winding 66 will be responsive to the difference of potential across the bridge, due to this unbalance. The secondary 66 is connected to a suitable full wave rectifier 70, which is connected to leads 71. It should be clear that since the position of armature 43 relative to coils 41 and 42 is changed with variations in the thickness of strip 21, the direct current voltage across leads 71 is responsive, therefore, to variations in the thickness. Although I prefer to obtain a voltage inductively responsive to variations in the thickness of the strip, it will be obvious that I can obtain this voltage conductively from leads 61.

The voltage between leads 71 may be employed to energize any suitable apparatus for controlling the operation of switches 26 and 27, and I therefore wish it clearly understood that my invention is not to be limited to the apparatus I am about to describe. I prefer to impress the voltage between leads 71 on a micro-ammeter represented by 72, the micro-ammeter having an indicating pointer 73 movable over a fixed scale 74, and two metallic arms 75 and 76 secured to the lower end of the pointer, the details of construction of the micro-ammeter not being shown, as they are well known to those skilled in the art. Adjustably mounted cups 77 and 78 contain an electrically conducting fluid 79, such as mercury. Cups 77 and 78 are so adjusted that at a predetermined position of pointer 73 the arm 75 just makes contact with the mercury in cup 77, and at another predetermined position of pointer 73 the arm 76 just makes contact with the mercury in cup 78. This micro-ammeter really constitutes an electroresponsive relay with two sets of contacts. Metallic arms 75 and 76 with the cups 77 and 78 control the energization of relays 80 and 81, which in turn control the energization of coils 28 and 29 of switches 26 and 27, respectively. Relay 80 has a pair of normally open contacts in series with coil 28, and relay 81 has a pair of normally open contacts in series with coil 29. From the connections between coils 28 and 29, the contacts of relays 80 and 81, and lines 24 and 25, it can be seen that when the contacts of relay 80 are closed the coil 28 is energized, and when the contacts of relay 81 are closed the coil 29 is energized. One end of the coil of relay 80 is connected to cup 77, one end of the coil of relay 81 is connected to cup 78, the remaining ends of the coils being connected to line 24. Contact arms 75 and 76 may be connected directly to line 25 by closing a switch 82, or may be connected to this line through the normally closed contacts of a relay 83 (whose purpose will be described later) when the relay is not energized. In either event, it will be clear that when arm 75 makes contact with the mercury in cup 77 the relay 80 will be energized, thus effecting the closing of switch 26, and when arm 76 makes contact with the mercury in cup 78 the relay 81 will be energized, thus effecting the closing of switch 27.

As previously described, one of the factors which determines the accuracy range of prior art apparatus depends on the change in the thickness of the metal rolled due to the operation of the roll adjusting motor during the time it takes for metal leaving the mill rolls to reach the gauging roller. This will also be true of my apparatus. Thus, when there is no appreciable change in the thickness of the strip caused by operation of motor 18 during the time it takes for metal leaving the rolls 10 and 11 to reach gauging rollers 51 and 55, then then this factor may be neglected and the operation of switches 26 and 27 may be controlled directly by micro-ammeter 72 and relays 80 and 81. When, however, there is an appreciable change in the thickness, then I have provided additional means for preventing this factor from affecting the accuracy range of my apparatus. I will first describe these additional means, and then I will describe the operation of my apparatus with and without them. These additional means comprise two arcuate metallic segments 84 and 85 having cut away portions at their peripheries, which portions may be left open, but are preferably filled with a strip of insulation, as shown by 86 and 87, respectively, in order to present continuous contact surfaces to stationary brushes 88 and 89, respectively. Segments 84 and 85 also have all metallic flanges on which rub stationary brushes 90 and 91, respectively, as shown in the drawings. Segments 84 and 85 are rotated by armature 20 of motor 18 and any driving means may be interposed between them, but for the sake of simplicity I have shown the segments secured to the shaft of the armature. Switch 26 has two pairs of normally open contacts 92 and 93, which are adapted to be closed by switch blades 94 and 95, respectively, when the switch is closed. Switch 27 has two pairs of normally open contacts 96 and 97, which are adapted to be closed by switch blades 98 and 99, respectively, when the switch is closed. Line 24 is connected to a contact 93 and a contact 97, the other contact 93 and 97 being connected in series with a switch 100 and the coil of relay 83 to brush 89. Relay 83 has a time delay in closing its contacts. This type of relay is so well known to those skilled in the art that its time delay producing means are diagrammatically represented by an air dashpot 101 and the arrow thereon representing time delay in closing the contacts when the relay is deenergized. Brush 88 is connected in series with a switch 100' to a contact 92 and a contact 96, the other contacts 92 and 96 being connected to cups 77 and 78, respectively. Brushes 90 and 91 are connected to line 25.

Assume that it is desired to roll sheet metal to a thickness of .0350", with a maximum variation of .0001" above and below. The positions of coils 41 and 42 are preferably so adjusted that when the thickness of the metal between gauging rollers 51 and 55 is just .0350", the pointer 73 is at the center of scale 74, as shown for example by its indication of 5 on the scale, and when this thickness is just .0349" or .0351", the pointer will indicate 3 and 7, respectively. Cups 77 and 79 are so adjusted that when pointer 73 indicates 5 neither of arms 75 and 76 makes contact with the mercury in these cups; when pointer 73 indicates 3 the arm 75 makes contact with the mercury in cup 77, and when pointer 73 indicates 7 the arm 76 makes contact with the mercury in cup 78.

I will now describe two methods of operating my apparatus. For convenience, I will define these methods as (1) non-notching operation, and (2) notching operation. The first method of operation is employed, for example, when operation of motor 18 effects a change of less than .0001" in the thickness of the metal being rolled during the time it takes for metal leaving rolls 10 and 11 to reach gauging rollers 51 and 55, and the second method of operation is employed when this change in thickness is .0001" or more. With the first method of operation the switches 100 and 100' are opened and switch 82 is closed. As long as the thickness of the metal passing between gauging rollers 51 and 55 during the rolling process is above .0349" and below .0351", then neither of arms 75 and 76 makes contact with the mercury in cups 77 and 78, and armature 20 of motor 18 remains at rest. When for some reason this thickness becomes .0349" or less, then arm 75 makes contact with the mercury in cup 77, thus effecting the energization of relay 80, which closes its contacts. The closing of the contacts of relay 80 effects the energization of coil 28, which causes switch 26 to close, this switch connecting armature 20 to lines 24 and 25 so that the rotation of the armature raises roll 10. When metal having a thickness slightly above .0349" reaches gauging rollers 51 and 55, then arm 75 breaks contact with the mercury in cup 77, thus causing switch 26 to open and brake 34 to bring armature 20 quickly to rest. The thickness of the metal at rolls 10 and 11 at the instant armature 20 is brought to rest will be less than .0351", since I have assumed that operation of motor 18 effects a change of less than .0001" in the thickness of the metal being rolled during the time it takes for metal leaving rolls 10 and 11 to reach gauging rolls 51 and 55. In a similar manner, when for some reason the thickness of the metal between gauging rollers 51 and 55 becomes .0351" or above, then arm 76 makes contact with the mercury in cup 78, thus effecting the energization of relay 81, which closes its contacts. The closing of the contacts of relay 81 effects the energization of coil 29, which causes switch 27 to close, this switch connecting armature 20 to lines 24 and 25 so that the rotation of this armature lowers roll 10. When metal having a thickness slightly below .0351" reaches gauging rollers 51 and 55, then arm 76 breaks contact with the mercury in cup 78, thus causing switch 27 to open and brake 34 to bring armature 20 quickly to rest. The thickness of the metal at rolls 10 and 11 at the instant armature 20 is brought to rest will be above .0349" for the reason described in connection with the operation when the metal between gauging rollers 51 and 55 was too thin. My apparatus, therefore, maintains the thickness of the rolled metal within .0001" of a predetermined value. If desired, I can maintain the thickness within other limits than .0001" by suitably adjusting the positions of coils 41 and 42.

Furthermore, by selecting suitable coils 41 and 42 and a suitable micro-ammeter 72, and by properly adjusting the position of these coils, I can obtain an amplification factor at high as 100,000, or even higher, between a change in the thickness of the metal passing between gauging rollers 51 and 55 and the movement of the contact-making ends of arms 75 and 76. This makes the distance which arms 75 and 76 must travel from one to the other contact-making positions sufficiently great so that the ordinary vibration near the mill cannot effect premature contact between any of the arms and the mercury in cups 77 and 78, and yet permits the maintaining of the thickness of the rolled metal within very narrow limits. In addition, micro-ammeter 72 may be placed somewhere remote from the mill, where no vibration exists. It, therefore, should be clear that my apparatus practically eliminates the first mentioned factor described near the beginning of this specification, this factor being largely responsible for the inability of prior art apparatus to maintain the thickness of rolled material within the very narrow limits demanded by present day industry.

With the second method of operation, switch 82 is opened and switches 100 and 100' are closed. The relative lengths of insulation strips 86 and 87 on segments 84 and 85, respectively, and the relative positions of brushes 88 and 89, are preferably so selected that with either direction of rotation of armature 20 of motor 18 the brush 88 makes contact with segment 84 slightly before brush 89 makes contact with segment 85. As hereinafter explained, armature 20 is brought to rest with brushes 88 and 89 in contact with insulation strips 86 and 87, respectively, as shown in the drawings. By tracing out the connections, it can be seen that relay 83 is not energized because brush 89 is not in contact with its segment 85, and that neither of relays 80 and 81 are energized because brush 88 is not in contact with its segment 84, and because neither of arms 75 and 76 are in contact with the mercury in cups 77 and 78. Switches 26 and 27 are, therefore, now under the control of micro-ammeter 72, because only operation of the latter can start operation of motor 18. As previously described, neither of switches 26 and 27 are closed as long as the thickness of the metal passing between gauging rollers 51 and 55 is above .0349" and below .0351". Now assume that the thickness of the metal just coming between gauging rollers 51 and 55 is .0349" or below. This causes arm 75 to make contact with the mercury in cup 77, thus effecting the closing of relay 80, which in turn effects the closing of switch 26. The closing of switch 26 causes the closing of its contacts 92 and 93 and starts rotation of armature 20 in a direction to raise roll 10. When armature 20 has rotated a slight amount the brush 88 comes into contact with its segment 84, and when the armature has rotated a slightly further amount the brush 89 comes into contact with its segment 85. The making of contact between brush 88 and its segment 84 closes a by-pass circuit for the coil of relay 80 around arm 75 and cup 77, while the making of contact between brush 89 and its segment 85 effects the energization of relay 83, the circuit being from line 24, through contacts 93 of switch 26, switch 100, the coil of this relay, brush 89, and segment 85, and brush 91 to line 25. The energization of relay 83 causes it to open its contacts, thus opening the circuit from line 25 to arms 75 and 76. Therefore, when armature 20 has rotated sufficiently far so that both of brushes 88 and 89 are in contact with their corresponding segments, the current flowing through the coil of relay 80 does not pass through arm 75 and cup 77, but passes through the following circuit: From line 24, through the coil of this relay, contacts 92 of switch 26, switch 100', brush 88, segment 84, and brush 90 to line 25. The result is that the control of switch 26 has been transferred from micro-ammeter 72 to segments 84 and 85 and the brushes thereon. When armature 20 has rotated almost a revolution, the brush 89 breaks contact with its segment 85, and when the armature has rotated a slightly further amount the brush 88 breaks contact with its segment 84. The breaking of contact between brush 89 and its segment 85 effects the deenergization of relay 83, but this relay does not reclose its contacts until a predetermined period has elapsed, as hereinafter explained. The breaking of contact between brush 88 and its segment 84 effects the opening of relay 80, which in turn effects the opening of switch 26. The opening of switch 26 disconnects armature 20 from lines 24 and 25 and effects the operation of brake 34 to bring the armature to rest with brushes 88 and 89 in contact with insulation strips 86 and 87, respectively, as shown in the drawings. The time delay means of relay 83 are so adjusted that the relay does not reclose its contacts until the metal that left rolls 10 and 11 at the instant armature 20 was brought to rest comes between gauging rollers 51 and 55, or very slightly beyond. The breaking of contact between segments 84 and 85 and their corresponding brushes, and the later reclosing of the contacts of relay 83, therefore, retransfers the control of switches 26 and 27 to micro-ammeter 72.

If at the instant the control of switches 26 and 27 was retransferred to micro-ammeter 72 the thickness of the metal between gauging rollers 51 and 55 has, as a result of the rotation of one revolution of armature 20, been increased to .0349", or slightly above, then the desired object will have been accomplished and no further operation will take place until the thickness again varies beyond the desired limits because arm 75 will have broken contact with cup 77; but if this thickness is still below .0349", then the above described operation will be repeated as many times as is necessary till this thickness is increased to .0349", or slightly above. By selecting worm wheels 14 with the proper number of teeth to mesh with worms 16, and by selecting studs 13 with the proper pitch of thread to mesh with the internal thread of worm wheels 14, I restrict the change in thickness of the metal caused by rotation of one revolution of armature 20 to less than .0002", thus enabling the apparatus to increase the thickness of the metal to somewhere between slightly above .0349" and slightly below .0351".

It should be obvious that if for some reason the thickness of the metal between gauging rollers 51 and 55 becomes .0351" or above, the operation of the apparatus will be identical to that just described, except that arm 76 will first make contact with the mercury in cup 78, and this will effect the closing of relay 81, which in turn will effect the closing of switch 27, and this will cause armature 20 to rotate in a direction to lower roll 10. It, therefore, should be clear that my apparatus will maintain the thickness of the rolled metal within .0001" of a predetermined value, or within any other desired limits with other adjustments, and that the notching operation of my apparatus eliminates any effect on the accuracy range due to the second mentioned factor described near the beginning of this specification, which factor is largely responsible for the inability of prior art apparatus to maintain the thickness of rolled metal within the very narrow limits demanded by present day industry.

In Fig. 2, I assume that the mill is rolling magnetic material, as, for example, sheet metal, and I take advantage of this fact to simplify my apparatus for detecting variations in the thickness of the rolled metal. I accomplish this result by passing the rolled metal over two rollers 102 and 103 which are non-movable in a vertical plane, and placing the coils 41 and 42 (connected in two arms of the Wheatstone bridge—see Fig. 1) on opposite sides of that portion of the metal passing between these rollers, thus causing the metal between the adjacent ends of the coils to act as a magnetic armature therefor. A variation in the thickness of the metal between the adjacent ends of coils 41 and 42 will change the air gap between the metal and the core surrounded by coil 41 without affecting the air gap between the metal and the core surrounded by coil 42, thus changing the difference of potential across the Wheatstone bridge, caused by an unbalance thereof, in response to variations in the thickness of the rolled metal. It should, therefore, be clear that the apparatus shown in Fig. 2 may be substituted for the corresponding apparatus shown in Fig. 1, and the operation will be identical to that described in connection with Fig. 1.

In Fig. 1, I employ electroresponsive means and mechanism driven by motor 18 for effecting the notching operation thereof, but in Fig. 3 I employ only electroresponsive means for accomplishing the same result. The electroresponsive means in Fig. 3 comprise a relay 104 having a pair of normally open contacts, the relay having a time delay in closing its contacts when it is energized. This type of relay is so well known to those skilled in the art that its time delay producing means are diagrammatically represented by an air dashpot 105 and the arrow thereon representing time delay in closing the contacts when the relay is energized. The remainder of the apparatus shown in Fig. 3 is identical to that shown in Fig. 1, except that some of the connections therebetween are different. Thus, in Fig. 3 the connections are such that the closing of the contacts 92 or 96 effects the energization of relay 104, the closing of the contacts of relay 104 effects the energization of relay 83, and the closing of contacts 93 or 97 short circuits the contacts of relays 80 and 81, respectively. For the sake of simplicity, I will describe the operation of the apparatus shown in Fig. 3 in connection with the apparatus shown in Fig. 1 for detecting variations in the thickness of the rolled metal, although it is equally as well operable with the apparatus shown in Fig. 2.

Referring to Figs. 1 and 3, assume that the thickness of the metal just coming between gauging rollers 51 and 55 is .0349" or below. This causes arm 75 to make contact with the mercury in cup 77, thus effecting the energization of relay 80, which closes its contacts. The closing of the contacts of relay 80 effects the energization of coil 28 of switch 26, the circuit in Fig. 3 being from line 24, through coil 28, and the contacts of relays 80 and 81, to line 25. Switch 26, therefore, closes, thus closing its contacts 92 and 93, and also connecting armature 20 of motor 18 to lines 24 and 25 to cause rotation of the armature in a direction to raise roll 10. The closing of contacts 93 short circuits the contacts of relay 80 (switch 100 being closed as shown), thus transferring the control of switch 26 from micro-ammeter 72 to relay 83. The closing of contacts 92 effects the energization of relay 104, but the time delay means of this relay are adjusted so that it does not close its contacts until a predetermined period has elapsed. In the case taken as an example, this predetermined period is such that rotation of the motor armature raises roll 10 a distance of less than .0002". At the end of this period, relay 104 closes its contacts and effects the energization of relay 83, which opens its contacts. The opening of the contacts of relay 83 effects the deenergization of coil 28, thus opening switch 26. The opening of switch 26 disconnects armature 20 from lines 24 and 25, and effects the operation of brake 34 to bring the armature quickly to rest. The opening of switch 26 also opens its contacts 92 and 93. The opening of contacts 92 effects the deenergization of relay 104, which opens its contacts and effects the deenergization of relay 83. The time delay means of relay 83 are so adjusted that the relay does not reclose its contacts until the metal that left rolls 10 and 11 at the instant the motor armature was brought to rest comes between gauging rollers 51 and 55. The opening of contacts 93 and the later reclosing of the contacts of relay 83 retransfers the control of switches 26 and 27 to micro-ammeter 72. If at the instant the control of switches 26 and 27 was retransferred to micro-ammeter 72 the thickness of the metal between gauging rollers 51 and 55 has, as a result of the rotation of the motor armature during the predetermined period, been increased to .0349" or slightly above, then the desired object will have been accomplished; but if this thickness is still below .0349", then the above described operation will be repeated as many times as is necessary until this thickness is increased to .0349" or slightly above. By suitably adjusting the time delay producing means of relay 104, I restrict the change in the thickness of the metal caused by operation of the motor armature during the time delay period of the relay to less than .0002", thus enabling the apparatus to increase the thickness of the metal to somewhere between slightly above .0349" and slightly below .0351".

It should be obvious that if for some reason the thickness of the metal between gauging rollers 51 and 55 becomes .0351" or above, the operation of the apparatus will be identical to that just described, except that arm 76 will first make contact with the mercury in cup 78, and thus will effect the closing of relay 81, which in turn will effect the closing of switch 27, and this will cause the motor armature to rotate in a direction to raise roll 10. It, therefore, should be evident that when the apparatus shown in Fig. 3 is substituted for the corresponding apparatus shown in Fig. 1, the thickness of the rolled material will be maintained within .0001" of a predetermined value, or within any other desired limits with other adjustments. Furthermore, when the apparatus shown in Fig. 3 is substituted for the corresponding apparatus shown in Fig. 1 and it is desired to obtain non-notching operation as described in connection with Fig. 1, this can be obtained by closing switch 82 and opening switch 100 in Fig. 3.

In connection with Figs. 1 and 3, I have described relay 83 as having a sufficient time delay in reclosing its contacts when it is deenergized to permit the metal which left rolls 10 and 11 at the instant armature 20 was brought to rest to come between gauging rollers 51 and 55. This time delay period of relay 83 is, however, satisfactory only for a particular rolling speed of the mill, which, for example, may be the normal rolling speed. If the rolling speed of the mill is increased above the normal and the time delay period of relay 83 is not changed, then relay 83 will reclose its contacts when the metal which left rolls 10 and 11 at the instant armature 20 was brought to rest has passed beyond gauging rollers 51 and 55, whereas if the rolling speed is decreased below the normal, then relay 83 will reclose its contacts before the metal which left rolls 10 and 11 at the instant armature 20 was brought to rest reaches gauging rollers 51 and 55. In either event, the result is an imperfect control of the thickness of the metal by the apparatus, thus tending to produce metal whose thickness is not within the desired limits. I avoid this undesirable result by employing the apparatus shown in Fig. 4.

In Fig. 4, I show a relay 106, which is to be substituted for the relay 83 in Figs. 1 and 3. Relay 106 has an opening coil 107, a pair of normally closed contacts 108, and time delay producing means 109 for making the relay have a time delay in closing its contacts after it is deenergized, these parts being similar to the corresponding parts of relay 83 in Figs. 1 and 3. The coil 107 and contacts 108 of relay 106 will be connected in identically the same manner as the corresponding parts of relay 83 in Fig. 1 or 3, according to which set of notching apparatus is employed. Relay 106, however, has in addition a coil 110, which may surround the same core as that surrounded by coil 107, but which I have preferably shown as surrounding a separate core attached to the relay. The coil 110 is so positioned with respect to the core it surrounds that when it is energized it exerts a downward pull on the core, thus tending to close contacts 108. Coil 110 is connected to an armature 111 of a direct current generator 112 having an exciting winding 113 energized from a direct current source 114. Armature 111 is driven by a motor 115 which drives rolls 10 and 11. The voltage generated by armature 111, and, therefore, the energization of coil 110, is substantially directly proportional to the rolling speed of the mill. Since the energization of coil 110 tends to close contacts 108, therefore, the time delay period of relay 106 in closing its contacts 108 after its coil 107 is deenergized will decrease when the rolling speed of the mill is increased, and, conversely, this time delay period will increase when the rolling speed is decreased. By selection of a suitable coil 110 and the core surrounded thereby, it is readily possible to make the tractive pull produced by coil 110 of such value that the magnitude of the time delay period of relay 106 is substantially inversely proportional to the rolling speed of the mill within its operating range. This will cause relay 106 to reclose its contacts 108 only when the metal which left rolls 10 and 11 at the instant armature 20 (Fig. 1) was brought to rest comes between gauging rolls 51 and 55 with all rolling speeds of the mill within its operating range. It should, therefore, be evident that when relay 106 in Fig. 4 is substituted for relay 83 in Figs. 1 and 3, the thickness of the rolled metal will be maintained within .0001" of a predetermined value, or within any other desired limits, with all rolling speeds of the mill within its operating range.

In accordance with the provisions of the patent statutes, I have described the principles of operation of my invention, together with the apparatus which I now consider to represent the best embodiment thereof, but I desire to have it understood that the apparatus shown and described is only illustrative, and that the invention may be carried out by other means.

What I claim as new and desire to secure by Letters Patent of the United States, is,—

1. A device for controlling the thickness of a moving strip of magnetic material being produced by a rolling mill having an adjustable roller for changing the thickness of the strip being produced, said device comprising electro-responsive means for changing the position of said roller to control the thickness of the strip being produced, a stationary alternating current energized inductive impedance element positioned adjacent said rolled strip but out of contact therewith, means for supporting that portion of the rolled strip passing adjacent said impedance so that variations in the thickness of said portion changes the ohmic value of said impedance, and means responsive to the current flowing in said impedance element for effecting the energization of said electro-responsive means so that the latter alters the position of said roller to maintain the thickness of the strip being produced at a substantially constant value.

2. A device for controlling the thickness of a moving strip of magnetic material being produced by a rolling mill having an adjustable roller for changing the thickness of the strip being produced, said device comprising electro-responsive means for changing the position of said roller to control the thickness of the strip being produced, an alternating current energized Wheatstone bridge having a stationary coil connected in one of its arms, said coil being positioned adjacent the rolled strip but out of contact therewith, means for supporting that portion of the rolled strip passing adjacent said coil so that variations in the thickness of said portion changes the impedance of said coil, and means responsive to the difference of potential across the Wheatstone bridge, caused by an unbalance thereof, for effecting the energization of said electro-responsive means so that the latter alters the position of said roller to maintain the thickness of the strip being produced at a substantially constant value.

3. A device for controlling the thickness of a moving strip of material being produced by a machine having mechanism operatively associated therewith for effecting a change in the thickness of the strip being produced and having a rotating winding reel on which the strip is wound as it leaves the machine, whereby that portion of the strip between the machine and the reel is maintained taut with its plane continuously changing, said device comprising an arm having a contact member engaging one side of said strip portion, another arm having a contact member engaging the other side of said strip portion, said contact members being substantially directly opposite each other, means for yieldingly urging said contact members towards each other, means for so supporting said arms that they are free to move both linearly and circumferentially in a plane which is substantially perpendicular to the plane of said strip portion, two relatively movable co-operating members respectively carried by said arms so that their relative positions change in accordance with variations in the thickness of the strip between said contact members, and means responsive to changes in the relative positions of said cooperating members for effecting the operation of said mechanism to maintain the thickness of the strip being produced at a substantially constant value.

4. In combination, a mill for rolling strip magnetic material, said mill having an adjustable roller, an electric motor for adjusting the position of said roller to vary the thickness of the strip being rolled, an alternating current energized Wheatstone bridge having two stationary coils respectively connected in two of its arms, said coils being positioned on opposite sides of the rolled material adjacent thereto but out of contact therewith, means for supporting that portion of the rolled material passing between said coils so that variations in the thickness of said portion changes the relative impedances of said coils, electroresponsive means having a movable element whose position changes in accordance with the voltage impressed on the electroresponsive means, connecting means for impressing on said electroresponsive means a voltage whose magnitude is responsive to the difference of potential across the Wheatstone bridge, caused by an unbalance thereof, and electromagnetic means controlled by said movable element for effecting the operation of said motor in one direction of rotation when the thickness of the rolled material passing between said coils is appreciably above a predetermined value, and in the opposite direction of rotation when the thickness of the rolled material passing between said coils is appreciably below said predetermined value.

5. A device for controlling the thickness of strips of material produced by a machine having mechanism operatively associated therewith for effecting a change in the thickness of the strip being produced, said device comprising means for effecting the operation of said mechanism, means responsive to variations in the thickness of the material produced by said machine for controlling the first mentioned means and for effecting the operation thereof when the thickness of the material produced varies appreciably from a predetermined value, and means responsive to the operation of the first mentioned means for removing the control thereof by the second mentioned means and for continuing the operation of the first mentioned means for a predetermined period.

6. A device for controlling the thickness of strips of material produced by a machine having mechanism operatively associated therewith for effecting a change in the thickness of the strip being produced, said device comprising means for effecting the operation of said mechanism, means responsive to variations in the thickness of the material produced by said machine for controlling the first mentioned means and for effecting the operation thereof when the thickness of the material produced varies appreciably from a predetermined value, and means responsive to the operation of the first mentioned means for removing the control thereof by the second mentioned means and for continuing the operation of the first mentioned means for a predetermined period and returning the control of the first mentioned means to the second mentioned means when a predetermined period has elapsed following cessation of operation of said mechanism.

7. A device for controlling the thickness of a moving strip of material produced by a machine having mechanism operatively associated therewith for effecting a change in the thickness of the strip being produced, said device comprising means for effecting the operation of said mechanism, means responsive to variations in the thickness of the material produced by said machine for controlling the first mentioned means and for effecting the operation thereof when the thickness of the material produced varies appreciably from a predetermined value, the second mentioned means being positioned ahead of said machine in the direction of the moving strip, and means responsive to the operation of the first mentioned means for removing the control thereof by the second mentioned means and for continuing the operation of the first mentioned means for a predetermined period and for returning the control of the first mentioned means to the second mentioned means when that portion of the strip which left the machine at the end of said period has traveled at least as far as the second mentioned means.

8. A device for controlling the thickness of a moving strip of material produced by a machine having mechanism operatively associated therewith for effecting a change in the thickness of the strip being produced, said device comprising means for effecting the operation of said mechanism, means responsive to variations in the thickness of the material produced by said machine for controlling the first mentioned means and for effecting the operation thereof when the thickness of the material produced varies appreciably from a predetermined value, the second mentioned means being positioned ahead of said machine in the direction of the moving strip, rotatable means driven by said first mentioned means, and means controlled by said rotatable means for removing the control of the first mentioned means by the second mentioned means and for continuing the operation of the first mentioned means for a predetermined period and for returning the control of the first mentioned means to the second mentioned means when that portion of the strip which left the machine at the end of said period has traveled at least as far as the second mentioned means.

9. A device for controlling the thickness of strips of material produced by a machine having mechanism operatively associated therewith for effecting a change in the thickness of the strip being produced, said device comprising means for effecting the operation of said mechanism, means responsive to variations in the thickness of the material produced by said machine for controlling the first mentioned means and for effecting the operation thereof when the thickness of the material produced varies appreciably from a predetermined value, normally inoperative means for controlling the operation of the first mentioned means in cooperation with the second mentioned means, said normally inoperative means being so arranged that operation thereof effects the cessation of operation of the first mentioned means, means responsive to the operation of the first mentioned means for removing the control thereof by the second mentioned means and for leaving the control of the first mentioned means only to said normally inoperative means, and time delay means responsive to the operation of the first mentioned means for effecting the operation of said normally inoperative means when said mechanism has been in operation for a predetermined period.

10. A device for controlling the thickness of strips of material produced by a machine having mechanism operatively associated therewith for effecting a change in the thickness of the strip being produced, said device comprising means for effecting the operation of said mechanism, means responsive to variations in the thickness of the material produced by said machine for controlling the first mentioned means and for effecting the operation thereof when the thickness of the material produced varies appreciably from a predetermined value, means operated by the first mentioned means for controlling the operation of the latter, and means responsive to the operation of the third mentioned means for transferring thereto the control of the first mentioned means from the second mentioned means when said mechanism has been in operation for a predetermined period and for making the first mentioned means ineffective to operate the mechanism when said mechanism has been in operation for a further predetermined period.

11. A device for controlling the thickness of strips of material produced by a machine having mechanism operatively associated therewith for effecting a change in the thickness of the strip being produced, said device comprising means for effecting the operation of said mechanism, means responsive to variations in the thickness of the material produced by said machine for effecting the operation of the first mentioned means when the thickness of the material produced varies appreciably from a predetermined value, means for effecting cessation of operation of said mechanism, time delay means responsive to the operation of the first mentioned means for effecting the operation of the third mentioned means when said mechanism has been in operation for a predetermined period, means responsive to the operation of the third mentioned means for making said time delay means ineffective, and additional time delay means for maintaining the third mentioned means in operative condition for a predetermined period after the first mentioned time delay means have been made ineffective.

12. A device for controlling the thickness of strips of material produced by a machine having mechanism operatively associated therewith for effecting a change in the thickness of the strip being produced, said device comprising means for effecting the operation of said mechanism, means responsive to variations in the thickness of the material produced by said machine for controlling the first mentioned means and for effecting the operation thereof when the thickness of the material produced varies appreciably from a predetermined value, means controlled by said mechanism, time delay means controlled by said mechanism, means responsive to the operation of said mechanism and said time delay means for transferring the control of the first mentioned means from the second mentioned means to the third mentioned means when said mechanism has been in operation for a predetermined period, means controlled by the third mentioned means for making the first mentioned means ineffective when said mechanism has been in operation for a further predetermined period, and means controlled by said mechanism and said time delay means for retransferring the control of the first mentioned means to the second mentioned means when the first mentioned means has been made ineffective by the third mentioned means for a predetermined period.

13. A device for controlling the thickness of strips of material produced by a machine having mechanism operatively associated therewith for effecting a change in the thickness of the strip being produced, said device comprising electroresponsive means for effecting the operation of said mechanism, means responsive to variations in the thickness of the material produced by said machine for effecting the energization of said electroresponsive means when the thickness of the material produced varies appreciably from a predetermined value, a relay having a pair of normally closed contacts connected in series with said electroresponsive means, a relay having a pair of normally open contacts for effecting the energization of the first mentioned relay by the closing of these normally open contacts, both of said relays having a time delay in closing their respective contacts, and means responsive to the energization of said electroresponsive means for effecting the energization of the second mentioned relay.

14. The combination with a machine for producing strips of material and with mechanism operatively associated with said machine for effecting a change in the thickness of the strip being produced thereby; of electroresponsive means for effecting the operation of said mechanism, means responsive to variations in the thickness of the material produced by said machine for effecting the energization of said electroresponsive means when the thickness of the material produced varies appreciably from a predetermined value, a relay having a pair of normally closed contacts connected in series with said electroresponsive means, said relay having a time delay in closing its contacts after it is deenergized, means for effecting the energization of said relay comprising a rotatable arcuate conducting segment driven by said mechanism and a stationary brush cooperating with the segment, means for effecting the energization of said electroresponsive means comprising another rotatable arcuate conducting segment driven by said mechanism and a stationary brush cooperating with the segment, the relationship between the relative lengths and positions of said segments and the magnitude of the time delay of said relay being such that the second mentioned segment breaks contact with its cooperating brush after the first mentioned segment breaks contact with its cooperating brush and before the reclosing of said pair of contacts, and means responsive to the breaking of contact between the second mentioned segment and its cooperating brush for bringing said mechanism to rest with neither of said segments in contact with their respective cooperating brushes.

15. A device for controlling a selected characteristic of strips of material produced by a machine having mechanism operatively associated therewith for effecting a change in said characteristic of the strip being produced, said device comprising means for effecting the operation of said mechanism, means responsive to variations in said characteristic of the material produced by said machine for controlling the first mentioned means and for effecting the operation thereof when said characteristic of the material produced varies appreciably from a predetermined value, means responsive to the operation of the first mentioned means for removing the control thereof by the second mentioned means and for effecting cessation of operation of said mechanism when the latter has been in operation for a predetermined period, means responsive to the operation of the third mentioned means for returning the control of the first mentioned means to the second mentioned means when a predetermined period has elapsed following cessation of operation of said mechanism, and means responsive to the operation of said machine for increasing the magnitude of the last mentioned period when the operating speed of said machine decreases and for decreasing the magnitude of the last mentioned period when the operating speed of said machine increases.

16. A device for controlling a selected characteristic of strips of material produced by a machine having mechanism operatively associated therewith for effecting a change in said characteristic of the strip being produced, said device comprising means for effecting the operation of said mechanism, means responsive to variations in said characteristic of the material produced by said machine for controlling the first mentioned means and for effecting the operation thereof when said characteristic of the material produced varies appreciably from a predetermined value, means responsive to the operation of the first mentioned means for removing the control thereof by the second mentioned means and for effecting cessation of operation of said mechanism when the latter has been in operation for a predetermined period, means responsive to the operation of the third mentioned means for returning the control of the first mentioned means to the second mentioned means when a predetermined period has elapsed following cessation of operation of said mechanism, and means responsive to changes in the operating speed of said machine for effecting changes in the magnitude of the last mentioned period to an extent which maintains a substantially inverse proportion between the magnitude of the last mentioned period and the operating speed of said machine.

17. The combination with a machine for producing strips of material and with mechanism operatively associated with said machine for effecting a change in the thickness of the strip being produced thereby; of electroresponsive means for effecting the operation of said mechanism, a relay having a pair of normally closed contacts connected in series with said electroresponsive means, said relay having a time delay in closing its contacts and having two windings surrounding its magnetic core, one relay winding being so positioned that energization thereof tends to make the relay open its contacts, and the second relay winding being so positioned that energization thereof tends to make the relay close its contacts, means responsive to variations in the thickness of the material produced by said machine for effecting the energization of said electroresponsive means when the thickness of the material produced varies appreciably from a predetermined value, means responsive to the energization of said electroresponsive means for controlling the energization and deenergization of the first mentioned relay winding, and means responsive to the operation of said machine for energizing the second mentioned relay winding with a current whose magnitude is substantially directly proportional to the operating speed of said machine.

18. In combination, a mill for rolling strip material, said mill having an adjustable roller, an electric motor for adjusting the position of said roller to vary the thickness of the strip being rolled, electroresponsive means for effecting operation of said motor in one direction of rotation, electroresponsive means for effecting operation of said motor in the opposite direction of rotation, a Wheatstone bridge, means for changing the degree of unbalance of said bridge in response to changes in the thickness of the rolled strip, electroresponsive means having a movable element whose position varies in accordance with the voltage impressed on the electroresponsive means, connecting means for impressing on the third mentioned electroresponsive means a voltage whose magnitude is responsive to the difference of potential across the bridge, caused by an unbalance thereof, contact means controlled by said movable element for effecting the energization of the first mentioned electroresponsive means when the thickness of the rolled strip is appreciably below a predetermined value, and for effecting the energization of the second mentioned electroresponsive means when the thickness of the rolled strip is appreciably above said predetermined value, a relay having a pair of normally closed contacts connected in series with the contact means controlled by said movable element, said relay having a time delay in closing its contacts after it is deenergized, means for effecting the energization of said relay, comprising a rotatable arcuate conducting segment driven by said motor and a stationary brush cooperating with the segment, a by-pass circuit across said pair of contacts, said circuit including a second rotatable arcuate conducting segment driven by said motor and a stationary brush cooperating with the segment, a brake for said motor, and means responsive to the deenergization of said motor for effecting the operation of said brake to bring said motor to rest with neither of said segments in contact with their respective cooperating brushes.

19. In combination, a mill for rolling strip material, said mill having an adjustable roller, an electric motor for adjusting the position of said roller to vary the thickness of the strip being rolled, electroresponsive means for effecting operation of said motor in one direction of rotation, electroresponsive means for effecting operation of said motor in the opposite direction of rotation, a Wheatstone bridge, means for changing the degree of unbalance of said bridge in response to changes in the thickness of the rolled strip, electroresponsive means having a movable element whose position varies in accordance with the voltage impressed on the electroresponsive means, connecting means for impressing on the third mentioned electroresponsive means a voltage whose magnitude is responsive to the difference of potential across the bridge, caused by an unbalance thereof, contact means controlled by said movable element for effecting the energization of the first mentioned electroresponsive means when the thickness of the rolled strip is appreciably below a predetermined value, and for effecting the energization of the second mentioned electroresponsive means when the thickness of the rolled strip is appreciably above said predetermined value, a relay having a pair of normally closed contacts connected in series with the windings of the first and second mentioned electroresponsive means, a relay having a pair of normally open contacts for effecting the energization of the first mentioned relay by the closing of these normally open contacts, both of said relays having a time delay in closing their respective contacts, and means responsive to the energization of either of the first and second mentioned electroresponsive means for effecting the energization of the second mentioned relay.

20. The method of controlling the thickness of a moving strip of rolled material being produced by a rolling machine, which comprises the steps of measuring the thickness of the rolled material at a predetermined distance from the rolling machine in the direction in which the rolled material is moving, continuously changing for a predetermined period the thickness of the rolled material as it is produced by the rolling machine in a manner which tends to bring the thickness of the material back to a predetermined value when the measured thickness varies appreciably from this predetermined value, again performing the thickness changing operation at the rolling machine as above described only after that portion of the rolled material which left the rolling machine at the end of the previous thickness changing operation has travelled at least said predetermined distance from the rolling machine and the measured thickness of the rolled material deviates appreciably from said predetermined value, and repeating the thickness changing operation at the rolling machine as described above during the remainder of the rolling operation on the strip.

21. That step in the method of controlling the thickness of a moving strip of rolled material being produced by a rolling machine, which consists in continuously changing for a predetermined period the thickness of the rolled material as it is produced by the rolling machine in a manner which tends to bring the thickness of the material back to a predetermined value whenever the thickness thereof at a predetermined distance from the rolling machine in the direction of its movement varies appreciably from a predetermined value, but starting each thickness changing operation subsequent to the first operation only after that portion of the rolled material which left the rolling machine at the end of the previous thickness changing operation has travelled at least said predetermined distance.

HARRY A. WINNE.